March 5, 1957 G. B. HAYES 2,783,924
DETACHABLE POURING SPOUT FOR VESSELS
Filed Nov. 5, 1954
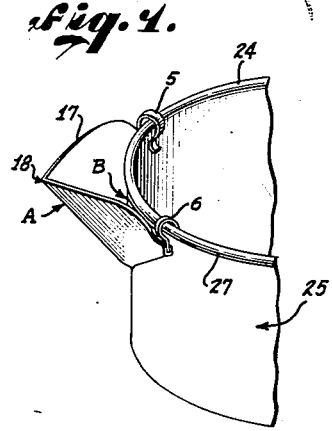
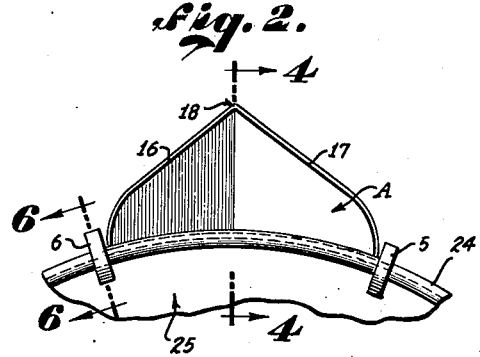
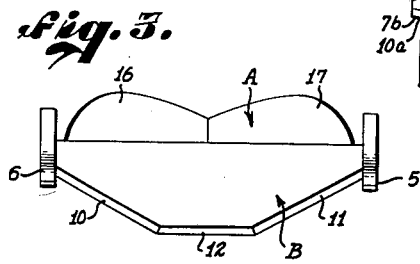
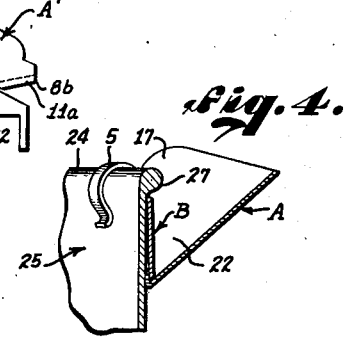
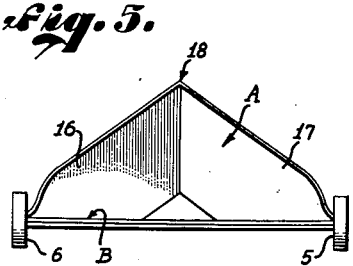
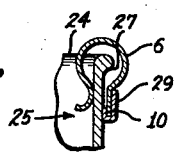
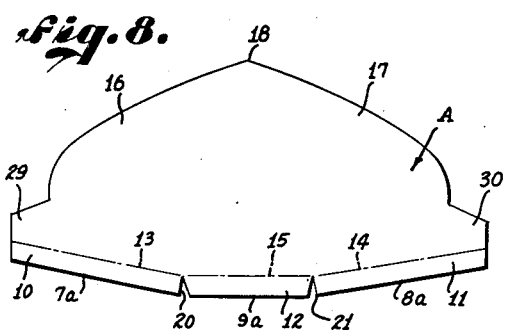
GORDON B. HAYES,
INVENTOR.
SELLERS & LATTA,
ATTORNEYS.
BY
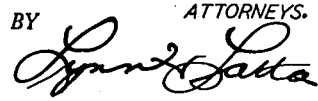

United States Patent Office 2,783,924
Patented Mar. 5, 1957

2,783,924

DETACHABLE POURING SPOUT FOR VESSELS

Gordon B. Hayes, Tarzana, Calif., assignor to
The Parsec Co., a partnership

Application November 5, 1954, Serial No. 467,189

9 Claims. (Cl. 222—569)

The invention relates to an improved attachable spout for vessels, the spout being particularly suitable for use with an open ended vessel having a beaded rim and an important object of the invention is to provide an attachable spout which will readily conform with the curvature of the vessel for preventing any drippage between the spout and the wall of the vessel.

Another object of the invention is to provide an attachable spout having a resilient bib portion for preventing dripping, the upper margin of the bib presenting a thin flexible unbeaded, ungasketed edge for establishing a sealing engagement with the container wall directly beneath the rim thereof.

Another object of the invention is to provide an attachable spout which is simple and inexpensive to manufacture and which can be made up of either one or two parts preferably in the form of stampings.

Other objects and advantages of the invention will be apparent from the ensuing specification and appended drawing in which:

Fig. 1 is a perspective view of the spout attached to the rim of a vessel;

Fig. 2 is a plan view of the spout of Fig. 1;

Fig. 3 is an end elevational view of the spout from that end which fits against the vessel wall;

Fig. 4 is a sectional view taken on the line 4—4 of Fig. 2;

Fig. 5 is a plan view of the spout per se;

Fig. 6 is a detail sectional view taken on the line 6—6 of Fig. 2;

Fig. 7 is a detail view of the blank from which the lip portion of the spout is fabricated;

Fig. 8 is a detail view of the blank from which the bib portion of the spout is fabricated; and Fig. 9 is a modified form of the invention.

In general the attachable spout of my invention includes the lip portion which may be referred to generally by the letter A and the apron or bib portion which may be referred to by the letter B, these two parts being secured together as will be explained hereinafter to form the assembled spout.

Referring to Figs. 7 and 8 I have shown the two parts from which the spout is fabricated, the blank from which the bib portion is formed being of substantial length and having the spaced fingers 2 and 3 integral with the upper edge 4 and projecting outwardly therefrom, these fingers being formed to provide the resilient hooks which may be referred to generally by the numerals 5 and 6. The underneath edges 7 and 8 of the bib blank are inclined upwardly from the lowermost and central edge 9.

The blank from which the lip portion of the spout is formed includes the lower edges 7a, 8a, and 9a, the edges 7a and 8a being inclined relative to the central edge 9a, the angles of inclination, however, being less than those of the edges 7 and 8 of the bib blank. Thus when the lip blank is assembled to the bib blank with the flanges 10, 11 and 12 folded over along the fold lines 13, 14 and 15 so as to follow the outline of the bib edges 7, 8 and 9, this results in the desired forming of the lip portion of the spout into the generally inclined side wings 16 and 17 which converge at a fold line 18 to form a dihedral angle of the spout. Thus a rather deep liquid retaining enclosure identified by the numeral 22 is formed between the bib and the internal wall of the pouring lip.

By providing suitable V-shaped notches 20 and 21 in the lower margin of the lip blank, I have made it possible to readily form the concavo-convex shape to the pouring lip and additionally thereto a degree of flexibility is imparted to the lower margin of the lip portion of the spout which facilitates the flexing of the bib portion of the spout in causing same to conform to the wall of the vessel to which the spout is attached.

As has been previously explained the bib is made of thin walled resilient material and the upper margin 4 extends in a straight line when in the form of the blank as shown in Fig. 7 and remains substantially straight after the lip has been assembled thereto, as indicated in Fig. 5. The hooks 5 and 6 which are integral with the bib are sufficiently strong and resilient so that when the hooks are installed onto the rim 24 of the vessel 25 in the manner as shown in Figs. 1 and 2, the upper longitudinal edge 4 of the bib will circumflect the outer wall of the vessel forming concavo convex surfaces and will hug the vessel wall in a sufficiently tight manner throughout the length of the upper margin of the bib between the hooks so that none of the liquid contents of the vessel will escape between the bib and the outer wall of the vessel either during the period when the vessel is tilted so as to guide the contents into the pouring spout for transfer to a second vessel or receptacle, or during the period when the vessel is returned to its normal upright position. It will be noted viewing Fig. 4 that when the vessel is in its normal upright position, the internal wall of the pouring lip is inclined upwardly rather sharply in defining an acute angle with reference to the bib and with reference to the vessel wall, consequently, the vessel must be tilted from its normal upright position before the pouring lip will lie in a horizontal position (or beyond) for releasing its and very little if any of the liquid will remain entrapped within the interior of the spout when the pouring is finished and the vessel is returned to upright position. Additionally in the securing of the lower margin of the lip to the lower margin of the bib a suitable seal is effected to prevent any liquid remaining in the spout from leaking out of the spout.

In the type of vessel which utilizes a circular bead 27 at the rim thereof, the upper edge of the bib will fit up closely adjacent to the underside of the bead so as to make it even more difficult for any drippage to occur between the bib and the outer vessel wall. It will be noted that there is no need for any gasket at the upper margin of the bib in order to effect a suitable seal between the upper edge of the bib and the outer wall of the vessel since the resiliency of the bib and its thinness will assure its necessary circumflection relative to the vessel wall in a sealing manner. It will also be noted that when the spout is installed onto the vessel rim as shown in Figs. 1 and 2 the flexing of the bib is sufficient to impart a general circumflection of the lower margins of the bib and pouring lip to effect general conformity to the outer wall of the vessel, however, the amount of flexure needed is not as severe as in the case of the upper margin of the bib where the flexing is circumferential relative to the vessel wall, whereas in the case of the lower margin of the spout the direction of flexure is divergently upwardly relative to the outer wall of the vessel as is best illustrated in Fig. 1.

If desired, in the fabrication of the spout wherein the flanges 10, 11 and 12 of the lip are doubled back so as to overhang the respective lower edges of the bib, an additional soldering operation can be added, in some instances, along the seam formed by the flanges to assure a liquid tight interior for the spout. It should also be noted that the lip blank of Fig. 8 has suitable extensions 29 and 30 at the outer ends of the side wings 16 and 17 which provide reinforcement adjacent the hooks in the assembled spout shown in Fig. 6.

In the modified form of the invention as shown in Fig. 9 a single stamping is employed from which the complete spout is fabricated, the lip portion A' being integrally joined to the bib portion B' by means of the central web portion 32. The fold line 33 is in a location comparable to the fold line 15 of Fig. 8 and the flanges 10a and 11a are of course doubled back so as to envelope the inclined edges 7b and 8b of the bib blank in the same manner as has been pointed out with reference to the spout of Figs. 1 through 8. It is usually desirable to solder along the seams of the flanges in order to assure that the finished spout will be leak proof as has been explained with reference to the spout of Figs. 1 through 8. In some instances it may be desirable to utilize vessel engaging hooks which are of thicker and stronger material than the bib B in which case such hooks could be in the form of separate strips which are welded or otherwise secured to the bib blank at the opposite ends of said blank, thereby making it possible to utilize a rather exceptionally thin walled bib to achieve greater flexibility if desired.

I claim:

1. For attachment to a vessel having a beaded rim, a detachable spout comprising: a bib portion having its underneath margin formed with a central edge and side edges intersecting the central edge at its opposite termini, said side edges diverging upwardly from the central edge to define obtuse angles in conjunction with the central edge; spaced fingers integral with the bib and projecting outwardly beyond the upper edge of the bib, said fingers being doubled back upon themselves to form hooks for overhanging the rim of the vessel; a pouring lip having its underneath margin notched at two locations providing a central flange and side flanges on either side of the central flange, each of said flanges being bent upwardly relatively to the remainder of the pouring lip so that the central flange overhangs the central edge of the bib and the side flanges overhang respectively one each of the inclined side edges of the bib; whereby a dished configuration is imparted to the pouring lip, the upper margin of the bib being adapted to hug the outer wall of the vessel immediately beneath the beaded rim thereof.

2. A spout for removable attachment to a vessel having a beaded rim as set forth in claim 1 wherein the bib is formed of relatively thin and resilient sheet metal so that the upper margin thereof will flex sufficiently to conform to the contour of the external wall of the vessel.

3. For attachment to a vessel having a rim and a curved outer wall, a detachable spout comprising: a pouring lip having its lower margin bent into a generally curved condition thereby imparting a generally concavo-convex configuration to the remainder of the pouring lip; a normally flat bib of thin walled resilient material having its lower margin secured to the lower margin of the pouring lip, said bib and the lower margin of the pouring lip being capable of being circumflected so as to generally conform to the contour of the external wall of the vessel and the upper margin of said bib being more easily circumflected than the lower margin thereof, whereby to fully conform to and hug the external wall of the vessel; and means secured to the spout for detachably connecting the same to the rim of the vessel in a manner to cause said bib and lower margin to so conform to the vessel wall, said bib extending upwardly with reference to the pouring lip and defining an acute angle with reference thereto, whereby, the inner concave surface of said pouring lip and said bib cooperatively provide a drip receptacle of considerable depth.

4. A detachable spout for attachment to the rim of a vessel as set forth in claim 3, wherein the means for securing the spout to the rim of the vessel includes spaced hooks secured to the spout at its upper margin for overhanging the rim of the vessel so as to effect said circumflection of the bib, and wherein the bib extends upwardly from said lower margin of the pouring lip and defines an acute angle with reference to said lip, said bib in conjunction with the inner concave surface of the pouring lip forming a liquid containing enclosure of considerable depth.

5. For attachment to a vessel having a rim and a curved outer wall, a detachable spout comprising: a pouring lip having its lower margin bent into a generally curved condition thereby imparting a generally concavo-convex configuration to the remainder of the pouring lip; a bib formed of flat thin walled resilient material having the central portion of its lower margin integral with the central portion of the lower margin of the pouring lip, the juncture line of bib and lip forming a bend line at which the bib is bent upwardly to define an acute angle with reference to the pouring lip, said lower margins of the bib and pouring lip being capable of being circumflected to a certain degree so as to generally conform to the contour of the external wall of the vessel and the upper margin of said bib being more easily circumflected than the lower margin thereof, whereby to readily conform to and hug the external wall of the vessel and means secured to the spout for detachably connecting same to the rim of the vessel.

6. For attachment to a vessel having a rim and a curved outer wall, a detachable spout comprising: a pouring lip and a bib, secured to one another along their respective lower margins and both projecting upwardly therefrom, at an acute angle relative to one another, said bib being normally flat, but resilient so that it may be bowed to conform to the said vessel wall, said bib having its maximum resilience at its upper edge so as to be fully conformable to said vessel wall for sealing said upper edge to said vessel wall to avoid entry of liquid between said upper edge and said vessel wall, and attachment hooks on said spout, located near said upper edge and near the lateral extremities of said spout, operable to receive said rim and to thereby attach said spout to said vessel with said bib bowed into conforming engagement with said vessel wall, said hooks being so disposed vertically with reference to said upper edge as to position the latter immediately beneath said rim and overhung thereby, whereby liquid dripping from said rim at the end of a pouring operation will be caught in a receptacle of substantial depth which is defined between said bib and said lip.

7. For attachment to kitchen vessels of the type having a rim and a curved outer wall, a detachable spout comprising: a pouring lip and a bib, secured to one another along their respective lower margins and both projecting upwardly therefrom at an acute angle relative to one another, and cooperatively defining a drip receptacle of substantial depth, said bib being normally more flat than the maximum wall curvature of such vessels, but resilient so that it may be bowed to conform to the said vessel wall, said bib having its maximum resilience at its upper edge so as to be fully conformable to said vessel wall for sealing said upper edge to said vessel wall to avoid entry of liquid between said upper edge and said vessel wall, and attachment hooks on said spout, located near said upper edge and near the lateral extremities of said spout, operable to receive said rim and to thereby attach said spout to said vessel with said bib bowed into conforming engagement with said vessel wall, said hooks being so disposed vertically with reference to said upper edge as to position the latter immediately beneath said rim and overhung thereby, whereby liquid dripping from said rim at the end of a pouring operation will be caught into said drip receptacle.

8. A pouring spout as defined in claim 7, wherein said bib and lip are so shaped and arranged with reference to one another that said bib may extend substantially vertically when attached to a substantially vertical wall, and said lip will then extend diagonally upwardly and outwardly from said joined lower edges.

9. For attachment to kitchen vessels of the type having a curved outer wall and a rim overhanging the same, a detachable spout comprising: a pouring lip and a bib, said lip and bib having lower edges joined to one another and arched upwardly at the lateral extremities thereof, and said lip and bib both extending upwardly from said joined lower edges, at an acute angle to one another, to define between them a drip receptacle of generally V-section and of substantial depth, said bib being normally more flat than the maximum wall curvature of such vessels, but being of thin, highly resilient material, and with sufficient resilience in said joined lower edges so that the spout as a whole may be bowed to establish general conformity of said bib to said vessel wall, said bib having maximum resilience at its upper edge so as to provide sufficiently full conformity thereof to said vessel wall to substantially avoid penetration with the lip to define a drip receptacle.

References Cited in the file of this patent

UNITED STATES PATENTS 1,298,031    Fromhagen _____ Mar. 25, 1919